(12) United States Patent
Zhang et al.

(10) Patent No.: US 10,447,713 B2
(45) Date of Patent: Oct. 15, 2019

(54) INTERNET TRAFFIC CLASSIFICATION VIA TIME-FREQUENCY ANALYSIS

(71) Applicants: AT&T Intellectual Property I, L.P., Atlanta, GA (US); AT&T Technical Services Company, Inc., Vienna, VA (US)

(72) Inventors: Rensheng Zhang, River Edge, NJ (US); Richard Hellstern, Cranbury, NJ (US); Anestis Karasaridis, Oceanport, NJ (US); Patrick Velardo, Jr., Manalapan, NJ (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 312 days.

(21) Appl. No.: 15/497,672

(22) Filed: Apr. 26, 2017

(65) Prior Publication Data

US 2018/0316693 A1 Nov. 1, 2018

(51) Int. Cl.
*H04L 29/06* (2006.01)
*H04L 12/26* (2006.01)
*H04W 4/70* (2018.01)

(52) U.S. Cl.
CPC .......... *H04L 63/1416* (2013.01); *H04W 4/70* (2018.02); *H04L 43/026* (2013.01); *H04L 43/16* (2013.01)

(58) Field of Classification Search
CPC ............. H04L 63/1425; H04L 63/1441; H04L 63/1408; H04L 63/1416; H04L 43/026; H04L 43/16; H04W 4/70
See application file for complete search history.

(56) References Cited

U.S. PATENT DOCUMENTS 7,170,860 B2    1/2007   Partridge et al.
7,200,656 B1    4/2007   Cousins
(Continued)

FOREIGN PATENT DOCUMENTS

CA    2854883       5/2013
CN    100486179     5/2009
(Continued)

OTHER PUBLICATIONS

Detection of DoS Attacks through Fourier Transform and Mutual Information, M. Mongelli et al. (Year: 2015).*
(Continued)

*Primary Examiner* — Alexander Lagor
*Assistant Examiner* — Vu V Tran
(74) *Attorney, Agent, or Firm* — Hartman & Citrin LLC

(57) ABSTRACT

Concepts and technologies disclosed herein are directed to internet traffic classification via time-frequency analysis. According to one aspect of the concepts and technologies disclosed herein, a security classification scheme can be implemented to identify potentially malicious activities from normal internet traffic. The security classification scheme can exploit the distinctive characteristics of different types of traffic in both frequency domain and time domain to identify four different cases. Due to the separation of different types of traffic, the security classification scheme can lower the false alarm rate and improve network security. The security classification scheme can utilize a recursive discrete Fourier transform ("DFT") implementation to enhance computational efficiency. The security classification scheme can be deployed for real-time network traffic monitoring due to an efficient streaming design and can be effectively used to detect and predict when and where the suspicious activities occur within a monitored network.

18 Claims, 11 Drawing Sheets

(56) References Cited

U.S. PATENT DOCUMENTS

| | | | |
|---|---|---|---|
| 7,283,461 B2 | 10/2007 | D'Souza et al. | |
| 7,574,597 B1 | 8/2009 | Cousins et al. | |
| 7,684,320 B1* | 3/2010 | Nucci | H04L 43/022 370/229 |
| 7,835,390 B2 | 11/2010 | Hernacki | |
| 7,877,621 B2 | 1/2011 | Jacoby et al. | |
| 8,001,601 B2 | 8/2011 | Duffield et al. | |
| 8,332,945 B2 | 12/2012 | Kim et al. | |
| 8,503,302 B2 | 8/2013 | Golic et al. | |
| 8,549,645 B2 | 10/2013 | Tang et al. | |
| 8,561,167 B2 | 10/2013 | Alperovitch et al. | |
| 8,763,114 B2 | 6/2014 | Alperovitch et al. | |
| 9,009,321 B2 | 4/2015 | Alperovitch et al. | |
| 9,363,278 B2 | 6/2016 | Maria | |
| 9,516,053 B1 | 12/2016 | Muddu et al. | |
| 9,584,533 B2 | 2/2017 | Watson et al. | |
| 2003/0097439 A1* | 5/2003 | Strayer | H04L 51/34 709/224 |
| 2004/0037229 A1* | 2/2004 | D'Souza | H04L 43/00 370/252 |
| 2009/0060006 A1* | 3/2009 | Liu | H04L 25/022 375/147 |
| 2015/0229661 A1 | 8/2015 | Balabine et al. | |
| 2016/0134651 A1 | 5/2016 | Hu et al. | |
| 2016/0140208 A1 | 5/2016 | Dang et al. | |
| 2016/0191390 A1* | 6/2016 | Barsumian | H04L 1/0668 370/208 |
| 2016/0226892 A1 | 8/2016 | Sen et al. | |

FOREIGN PATENT DOCUMENTS

| | | |
|---|---|---|
| WO | WO 2008067442 | 6/2008 |
| WO | WO 2016115280 | 7/2016 |

OTHER PUBLICATIONS

Intrusion Detection System using Discrete Fourier Transform, Hidema Tanaka et al. (Year: 2014).*

Buttyan et al., "Traffic Analysis Attacks and Countermeasures in Wireless Body Area Sensor Networks," 2012 IEEE International Symposium on a World of Wireless, Mobile and Multimedia Networks (WoWMoM), Jun. 25-28, 2012, IEEE 2012.

Cobbah, Maxwell, "Network Intrusion Detection and Countermeasure Selection in Virtual Network (NIDCS)" Master of Science Thesis, Department of Electrical and Electronic Engineering, College of Engineering, Kwame Nkrumah University of Science and Technology, Oct. 2015.

Suganya, G., "An Efficient Network Traffic Classification Based on Unknown and Anomaly Flow Detection Mechanism," International Journal of Computer Trends and Technology, Apr. 2014, vol. 10, No. 4, pp. 187-191.

Partridge et al., "Using Signal Processing to Analyze Wireless Data Traffic," Proceedings of the 1st ACM Workshop on Wireless Security (WiSe '02), Sep. 29, 2002, ACM 2002.

* cited by examiner

INTERNET TRAFFIC CLASSIFICATION VIA TIME-FREQUENCY ANALYSIS

BACKGROUND

Malicious network traffic can cause disruptions in network services, consumer fraud, loss of information, and other problems. Malicious traffic is typically hidden within normal traffic, the majority of which is consumer traffic ("CT") and machine-to-machine ("M2M") traffic. Since an attacker will attempt to hide or obfuscate malicious traffic, it is difficult for network providers to detect and to predict when and where malicious traffic will appear. Techniques for detecting malicious activity also are prone to false alarms when normal traffic cannot be separated from traffic associated with malicious activities.

Most existing malicious activity detection techniques focus on analyzing time-domain characteristics. Some techniques apply correlations between unknown traffic and known traffic patterns. Other techniques set up alarm thresholds for pre-warning or following examinations. Yet other techniques use a training set for supervised learning. Moreover, existing techniques cannot be implemented with streaming network traffic due to computational complexities.

SUMMARY

Concepts and technologies disclosed herein are directed to internet traffic classification via time-frequency analysis. According to one aspect of the concepts and technologies disclosed herein, an internet traffic classification system can receive an internet traffic sequence that includes non-malicious data packets and malicious data packets. The internet traffic classification system can extract, from the internet traffic sequence, a plurality of consecutive samples to be used for classification of the internet traffic sequence. The internet traffic classification system can convert the plurality of consecutive samples of the internet traffic sequence from a time domain to a frequency domain via a discrete Fourier transform. The internet traffic classification system can determine whether a largest power spectrum in the plurality of consecutive samples of the internet traffic sequence is greater than a threshold portion of a total power spectra of the plurality of consecutive samples of the internet traffic sequence. When the largest power spectrum in the plurality of consecutive samples of the internet traffic sequence is greater than the threshold portion of the total power spectra, the internet traffic classification system can determine that the plurality of consecutive samples of the internet traffic sequence includes a consumer traffic component and can remove, from the plurality of consecutive samples of the internet traffic sequence, any samples of the plurality of consecutive samples corresponding to the consumer traffic component. The internet traffic classification system can calculate a mean and a variance of a remaining portion of the internet traffic sequence. The remaining portion of the internet traffic sequence can include the plurality of consecutive samples without any samples corresponding to the consumer traffic component. The internet traffic classification system can set, based upon the mean and the variance of the remaining portion of the internet traffic sequence, a threshold for detection of M2M traffic. The internet traffic classification system can record a series of time indices for samples in the remaining portion of the internet traffic sequence that are greater than the threshold for detection of M2M traffic. The internet traffic classification system can compute time differences between adjacent time indices within the series of time indices. The internet traffic classification system can create a histogram using the time differences. The internet traffic classification system can count the histogram. When most occurrences in the histogram are in association with a specific time difference, the internet classification system can determine that the remaining portion of the internet traffic sequence includes an M2M traffic component.

In some embodiments, the internet classification system can classify the internet traffic sequence as including the consumer traffic component only. In other embodiments, the internet classification system can classify the internet traffic sequence as including the M2M traffic only. In other embodiments, the internet classification system can classify the internet traffic sequence as including the computer traffic component and the M2M traffic component. In other embodiments, the internet classification system can classify the internet traffic sequence as including an unknown traffic component.

In some embodiments, the internet classification system can perform the aforementioned operations through a sliding window. The sliding window can focus on one sample of the plurality of consecutive samples.

In some embodiments, the internet classification system can convert the plurality of consecutive samples of the internet traffic sequence from a time domain to a frequency domain via a recursive discrete Fourier transform. In these embodiments, the computational complexity of the conversion can be one order magnitude lower.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
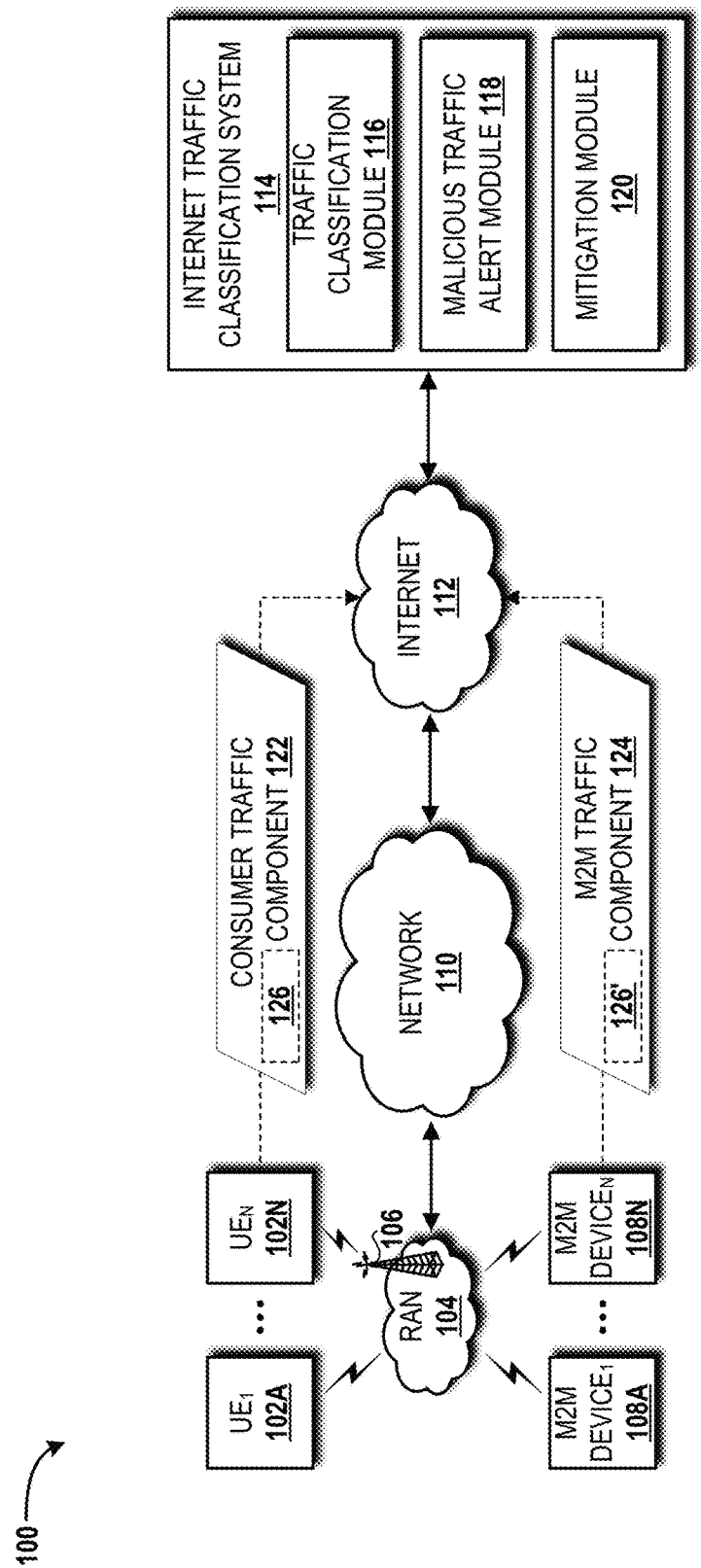
FIG. 1 is a block diagram illustrating an illustrative operating environment capable of implementing aspects of the concepts and technologies disclosed herein.

The concepts and technologies disclosed herein are directed to internet traffic classification via time-frequency analysis. According to one aspect of the concepts and technologies disclosed herein, a security classification scheme can be implemented to identify potentially malicious activities from normal internet traffic. The security classification scheme can exploit the distinctive characteristics of different types of traffic in both frequency domain and time domain to identify four different cases. Due to the separation of different types of traffic, the security classification scheme can lower the false alarm rate and improve network security. The security classification scheme can utilize a recursive discrete Fourier transform ("DFT") implementation to enhance computational efficiency. The security classification scheme can be deployed for real-time network traffic monitoring due to an efficient streaming design and can be effectively used to detect and predict when and where the suspicious activities occur within a monitored network.

The recursive approach utilized by the disclosed security classification scheme can classify potentially malicious traffic from consumer traffic, machine-to-machine ("M2M") traffic, or combination consumer traffic and M2M traffic. Since consumer traffic and M2M traffic have distinctive frequency spectrum profiles, the disclosed security classification scheme can convert an internet traffic sequence to frequency spectra via DFT. For example, consumer traffic might have a frequency spectrum profile that exhibits a single spike while M2M traffic might have a frequency spectrum profile with outspread and identically repeating spikes.

The disclosed security classification scheme can detect consumer traffic in terms of a ratio of the largest power spectrum over the total power spectra. If the ratio is higher than a threshold, consumer traffic likely exists in the traffic sequence. A time-domain formula can be used to subtract the consumer traffic from the traffic sequence, in which case no inverse DFT is needed. If the ratio is lower than the threshold, no consumer traffic is detected, and therefore it can be determined that the traffic sequence includes only M2M traffic (i.e., no subtraction is needed). After subtraction the disclosed security classification scheme can calculate a mean and a variance of the remaining traffic sequence to set a threshold for detection of M2M traffic in the remaining traffic sequence. If a given sample of the remaining traffic sequence is greater than the threshold, the time index for that sample is recorded; otherwise, the sample is skipped. After obtaining a series of time indices for a plurality of samples, a histogram can be generated, the time differences between adjacent time indices can be computed, and the histogram can be counted. When the most occurrences happen on a specific time interval in the histogram, this can be determined to be indicative that M2M traffic is contained in the remaining traffic sequence. Based upon the two detections with consumer traffic and M2M traffic, the security classification scheme can classify internet traffic into one of four traffic profiles: consumer traffic, consumer traffic and M2M traffic, M2M traffic, and unknown. The aforementioned operations can be implemented through a sliding window with one sample shift each time. Since most computations are from DFT, the security classification scheme uses recursive DFT to decrease the computational complexity of these computations by at least one order of magnitude. As a recursive classifier, the disclosed classification scheme can be deployed for real-time network traffic monitoring for pre-warning or anomaly detection.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies internet traffic classification via time-frequency analysis will be described.

Turning now to FIG. 1, an operating environment 100 in which aspects of the concepts and technologies disclosed herein can be implemented will be described, according to an embodiment. The illustrated operating environment 100 includes a plurality of user equipment devices ("UEs") 102A-102N (referred to herein collectively as UEs 102, or generally in the singular form as UE 102) operating in communication with a radio access network ("RAN") 104. The UEs 102 can communicate with the RAN 104 by way of one or more eNodeBs ("eNBs") 106. The operating environment 100 also includes a plurality of M2M devices 108A-108N (referred to herein collectively as M2M devices 108, or generally in the singular form as M2M device 108) also operating in communication with the RAN 104 by way of one or more eNBs 106.

Each of the UEs 102 can be a cellular phone, a feature phone, a smartphone, a mobile computing device, a tablet computing device, a portable television, a portable video game console, or the like capable of communicating with the RAN 104. The RAN 104 can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a multi-standard metro cell ("MSMC") cell-type, and a white space network cell-type. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated WWAN WI-FI and cellular technologies, and as such, one or more of the UEs 102 can be a dual-mode device.

The M2M devices 108, in some embodiments, form, at least in part, an IoT network (not shown). The M2M devices 108 can be deployed across various industry segments and embedded in a variety of locations, such as basements in multi-dwelling units, underground tunnels, manholes, subway systems, and/or the like, where there could be emergency situations that need to be handled to protect safety of humans, machines, and their interactions. IoT is a concept of making physical objects, collectively "things," also referred to herein as the M2M devices 108, network addressable to facilitate interconnectivity for the exchange of data. The IoT network can include any number of "things," including the M2M devices 108, for example. The M2M devices 108 can be or can include any "thing" that can collect data and that is configured to be network addressable so as to connect to and communicate with one or more networks, such as the RAN 104, over which to communicate the data to other connected devices, including, for example, computers, smartphones, tablets, vehicles, other M2M devices, combinations thereof, and the like. The M2M devices 108 can be deployed for consumer use and/or business use, and can find application in many industry-specific use cases. For example, the M2M devices 108 may find at least partial application in the following industries: automotive, energy, healthcare, industrial, retail, and smart buildings/homes. Those skilled in the art will appreciate the applicability of M2M-solutions in other industries as well as consumer and business use cases. For this reason, the applications of the M2M devices 108 described herein are used merely to illustrate some examples and therefore should not be construed as being limiting in any way. Although in the illustrated example the M2M devices 108 are shown as being in communication with one RAN (i.e., the RAN 104), the M2M devices 108 may be in communication with any number of access networks, including networks that incorporate collocated WWAN WI-FI and cellular technologies, and as such, one or more of the M2M devices 108 can be a dual-mode device.

The RAN 104 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102 and the M2M devices 108. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved UTRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes one or more virtual RANs ("vRANs").

As used herein, a "base station" refers to a radio receiver and/or transmitter (collectively, transceiver) that is/are configured to provide a radio/air interface over which the UEs 102 and the M2M devices 108, can connect to a network 110. Accordingly, a base station is intended to encompass one or more base transceiver stations ("BTSs"), one or more NBs, one or more eNBs (e.g., the eNB 106), one or more home eNBs (not shown), one or more wireless access points ("APs"), one or more MSMC nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102 and the M2M devices 108.

The network 110 can include one or more core networks, such as one or more evolved packet core ("EPC") networks. The network 110 embodied in this manner can provide EPC network functions for the UEs 102 and the M2M devices 108. In some embodiments, the network 110 includes an EPC network for the UEs and another EPC network for the M2M devices 108. As an EPC network, the network 110 can include one or more mobility management entities ("MME"), one or more application servers ("AS"), one or more home subscriber servers ("HSS"), one or more evolved serving mobile location centers ("ESMLC"), one or more gateway mobile location centers ("GMLC"), one or more serving gateways ("SGW"), one or more packet data network gateways ("PGWs"), some combination thereof, and/or the like. These network functions can be implemented as physical network functions ("PNFs") having hardware and software components. The core network components can additionally or alternatively be provided, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). An example network virtualization platform ("NVP") architecture that might be used to implement various core network components embodied as VNFs is described herein below with reference to FIG. 8. Moreover, the core network components can be embodied as VNFs in one or more VNF pools, each of which can include a plurality of VNFs providing a particular core network function.

The illustrated network 110 is in communication with an internet 112. The internet 112 can facilitate communications among connected computers and/or devices, such as the UEs 102 and the M2M devices 108. The internet 112, in some embodiments, is or includes the Internet, which is well-known in the art and therefore not described further herein.

The operating environment 100 also includes an internet traffic classification system 114 that can execute, via one or more processors (best shown in FIG. 5), a traffic classification module 116, a malicious traffic alert module 118, and a mitigation module 120. Each of the modules 116-120 can include instructions that, when executed by one or more processors, cause the internet traffic classification system 114 to perform operations described herein, such as the operations described herein below with reference to FIGS. 2A-2B and FIGS. 3A-3C. A brief description of these modules will now be provided.

The traffic classification module 116 can implement a security classification scheme to identify potentially malicious activities from normal internet traffic. In the illustrated example, traffic originating from one or more of the UEs 102 is illustrated as a consumer traffic component 122 of internet traffic, and traffic originating from one or more of the M2M devices 108 is illustrated as an M2M traffic component 124. The consumer traffic component 122 and the M2M traffic component 124 can hide malicious traffic 126, 126'.

The traffic classification module 116 can utilize the security classification scheme to exploit the distinctive characteristics of different types of internet traffic (e.g., consumer traffic and M2M traffic) in both frequency domain and time domain to identify four different cases. Due to the separation of different types of traffic, the security classification scheme can lower the false alarm rate and improve network security. The security classification scheme can utilize a recursive DFT implementation to enhance computational efficiency. The security classification scheme can be deployed for real-time network traffic monitoring due to an efficient streaming design and can be effectively used to detect and predict when and where the suspicious activities occur within a monitored network.

The recursive approach utilized by the disclosed security classification scheme can classify the malicious traffic 126, 126' from the consumer traffic component 122 and/or the M2M traffic component 124. Since consumer traffic and M2M traffic have distinctive frequency spectrum profiles, the disclosed security classification scheme can convert an internet traffic sequence to frequency spectra via DFT. For example, consumer traffic might have a frequency spectrum profile that exhibits a single spike while M2M traffic might have a frequency spectrum profile with outspread and identically repeating spikes.

The disclosed security classification scheme can detect consumer traffic in terms of a ratio of the largest power spectrum over the total power spectra. If the ratio is higher than a threshold, consumer traffic likely exists in the traffic sequence. A time-domain formula can be used to subtract the consumer traffic from the traffic sequence, in which case no inverse DFT is needed. If the ratio is lower than the threshold, no consumer traffic is detected, and therefore it can be determined that the traffic sequence includes only M2M traffic (i.e., no subtraction is needed). After subtraction the disclosed security classification scheme can calculate a mean and a variance of the remaining traffic sequence to set a threshold for detection of M2M traffic in the remaining traffic sequence. If a given sample of the remaining traffic sequence is greater than the threshold, the time index for that sample is recorded; otherwise, the sample is skipped. After obtaining a series of time indices for a plurality of samples, a histogram can be generated, the time differences between adjacent time indices can be computed, and the histogram can be counted. When the most occurrences happen on specific time interval in the histogram, this can be determined to be indicative that M2M traffic is contained in the remaining traffic sequence. Based upon the two detection with consumer traffic and M2M traffic, the security classification scheme can classify internet traffic into one of four traffic profiles: consumer traffic, consumer traffic and M2M traffic, M2M traffic, and unknown. The aforementioned operations can be implemented through a sliding window with one sample shift each time. Since most computations are from DFT, the security classification scheme uses recursive DFT to decrease the computational complexity of these computations by at least one order of magnitude. As a recursive classifier, the disclosed classification scheme can be deployed for real-time network traffic monitoring for pre-warning or anomaly detection. Additional details in this regard are described herein below with reference to FIGS. 2A-2B and FIGS. 3A-3C.

The malicious traffic alert module 118 can generate one or more alerts responsive to detection of traffic that does not classify within one of the aforementioned traffic profiles. The alert(s) can be used to notify one or more individuals and/or other entities that further investigation is needed. Anomaly detection can be launched to determine to which kind of malicious behavior the traffic belongs.

Once a specific malicious behavior pattern has been detected, the traffic can be decomposed into lower-level detailed subcomponents. The lower-level decomposition can reduce the complexity of traffic signals, and in turn, can facilitate the following root-cause analysis within each individual subcomponent. After determining the root cause, the mitigation module 120 can be used to mitigate the severity of risks, such as, for example, closing one or more network ports re-routing at least some of the traffic, and/or blocking one or more types of network connections. Those skilled in the art will appreciate the applicability of other mitigation techniques to be implemented by the mitigation module 120.

Figure 2A:
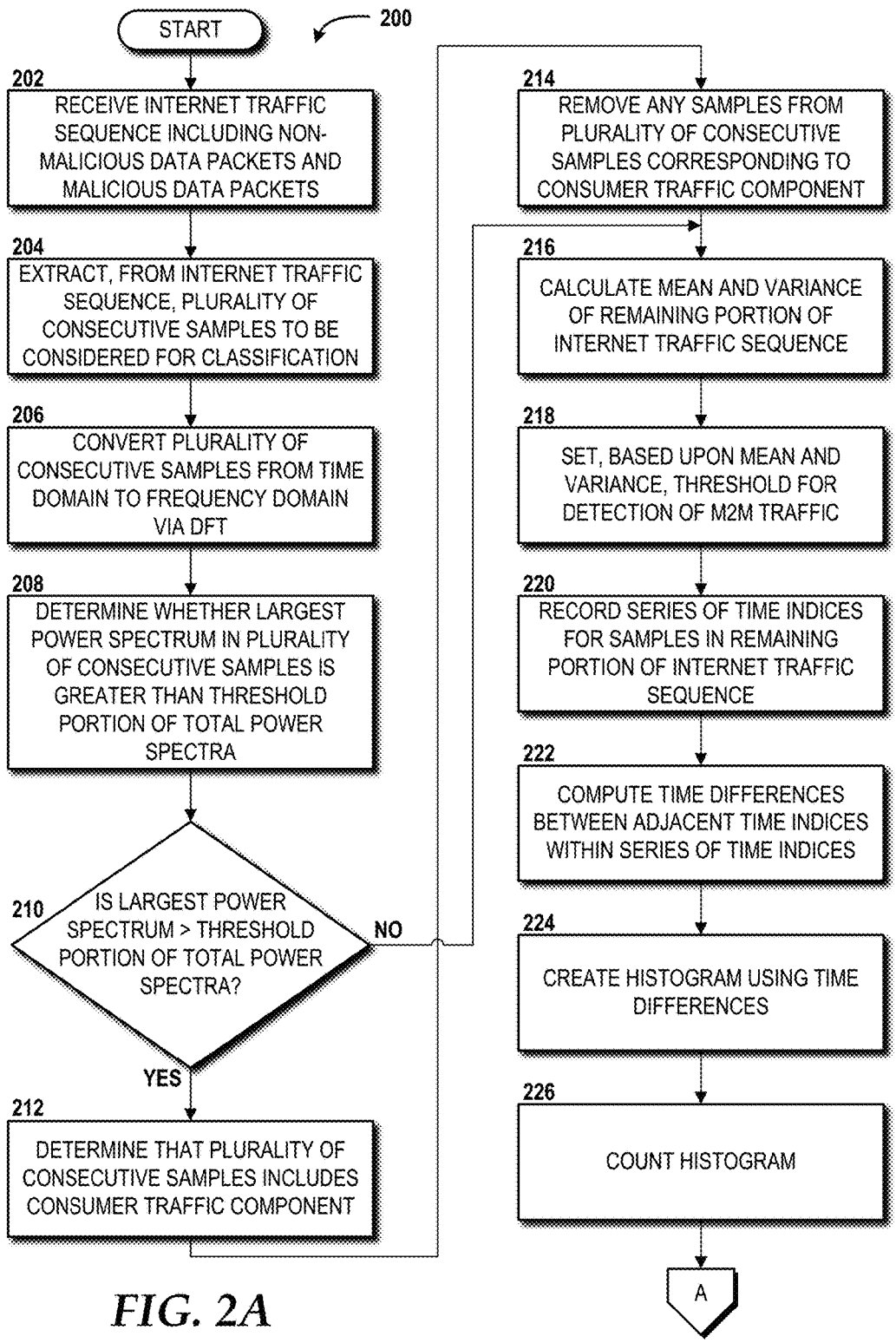
FIGS. 2A-2B are flow diagrams illustrating aspects of a method for classifying internet traffic, according to an illustrative embodiment.
Figure 2B:
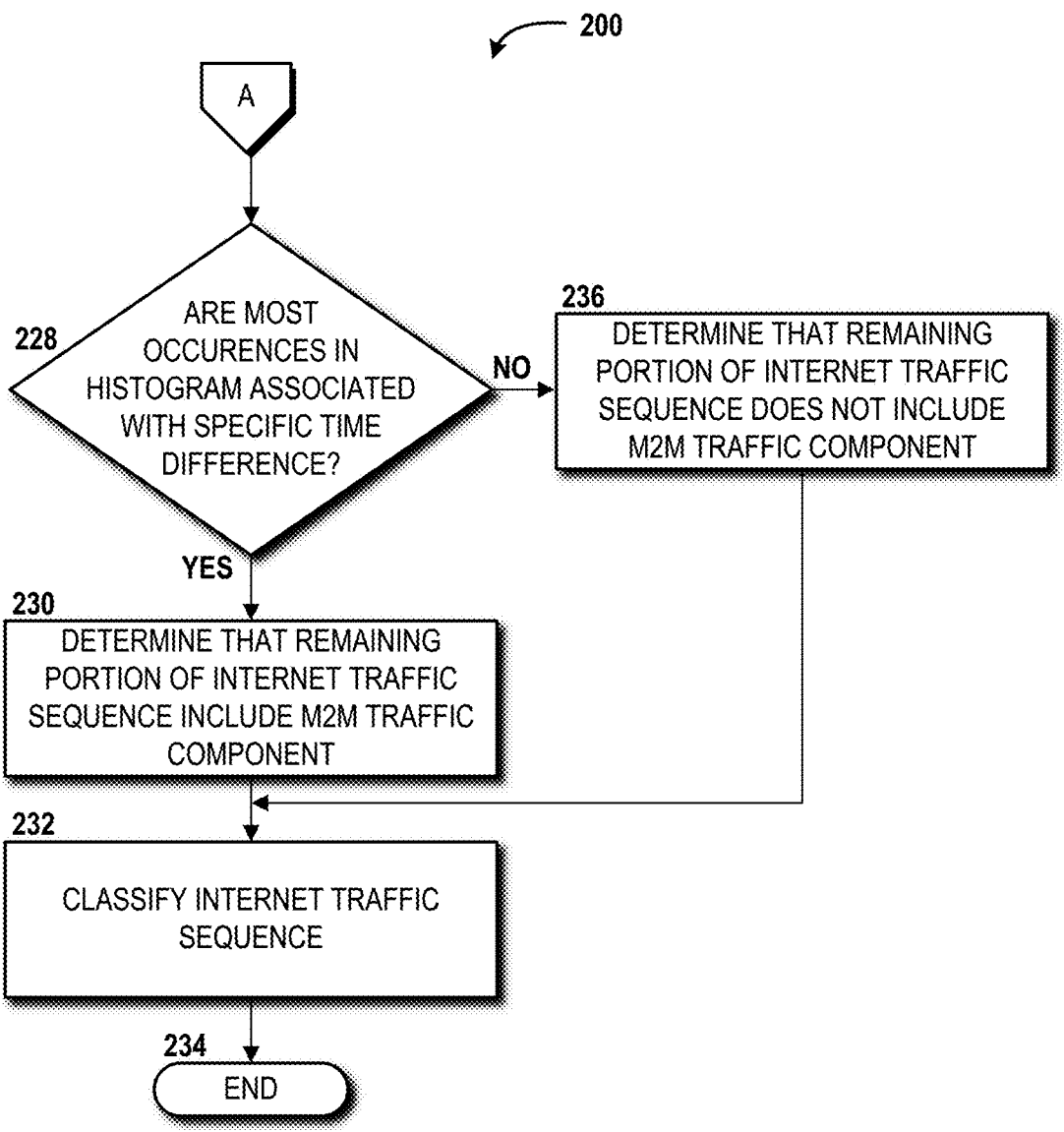

Turning now to FIGS. 2A-2B, aspects of a method 200 for classifying internet traffic will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 200 is described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIGS. 2A-2B and additional reference to FIG. 1. The operations disclosed as part of the method 200 provide a general overview of a method for classifying internet traffic. Additional details of a method for classifying internet traffic are provided herein below with reference to FIGS. 3A-3C.

Turning now to FIG. 2A, the method 200 begins and proceeds to operation 202, where the internet traffic classification system 114 receives an internet traffic sequence, including non-malicious data packets and malicious data packets. The internet traffic sequence can include a consumer traffic component 122 and/or an M2M traffic component 124 as shown in the example of FIG. 1, either or both of which can contain malicious traffic 126, 126'.

From operation 202, the method 200 proceeds to operation 204, where the internet traffic classification system 114 extracts, from the internet traffic sequence, a plurality of consecutive samples to be considered for classification. From operation 204, the method 200 proceeds to operation 206, where the internet traffic classification system 114 converts the plurality of consecutive samples from the time domain to the frequency domain via DFT.

From operation 206, the method 200 proceeds to operation 208, where the internet traffic classification system 114 determines whether a largest power spectrum in the plurality of consecutive samples is greater than a threshold portion of a total power spectra. From operation 208, the method 200 proceeds to operation 210, where if the internet traffic classification system 114 determines that the largest power spectrum in the plurality of consecutive samples is greater than the threshold portion of the total power spectra, the method 200 proceeds to operation 212, where the internet traffic classification system 114 determines that the plurality of consecutive samples includes a consumer traffic component (e.g., the consumer traffic component 122 shown in FIG. 1).

From operation 212, the method 200 proceeds to operation 214, where the internet traffic classification system 114 removes any samples from the plurality of the consecutive samples corresponding to the consumer traffic component 122. From operation 214, the method 200 proceeds to operation 216, where the internet traffic classification system 114 calculates a mean and a variance of a remaining portion of the internet traffic sequence—that is, one or more samples remaining in the plurality of the consecutive samples after removal of one or more samples corresponding to the consumer traffic component 122. From operation 216, the method 200 proceeds to operation 218, where the internet traffic classification system 114 sets, based upon the mean and the variance calculated during operation 216, a threshold for detection of M2M traffic in the internet traffic sequence.

From operation 218, the method 200 proceeds to operation 220, where the internet traffic classification system 114 records a series of time indices for the samples in the remaining portion of the internet traffic sequence. From operation 220, the method 200 proceeds to operation 222, where the internet traffic classification system 114 computes time differences between adjacent time indices within the series of time indices.

From operation 222, the method 200 proceeds to operation 224, where the internet traffic classification system 114 creates a histogram using the time differences computed during operation 222. From operation 224, the method 200 proceeds to operation 226, where the internet traffic classification system 114 counts the histogram. From operation 226, the method 200 proceeds to operation 228 shown in FIG. 2B, where the internet traffic classification system 114 determines whether most occurrences in the histogram are associated with a specific time difference. If so, the method 200 proceeds to operation 230, where the internet traffic classification system 114 determines that the remaining portion of the internet traffic sequence includes an M2M traffic component (e.g., the M2M traffic component 124 shown in FIG. 1). If not, the method 200 to operation 236, where the internet traffic classification system 114 determines that the remaining portion of the internet traffic sequence does not include an M2M component.

From operation 230 or operation 236, the method 200 proceeds to operation 232, where the internet traffic classification system 114 classifies the internet traffic sequence. From operation 232, the method 200 proceeds to operation 234. The method 200 ends at operation 234.

Returning to operation 210 shown in FIG. 2A, where if the internet traffic classification system 114 determines that the largest power spectrum in the plurality of consecutive samples is not less than the threshold portion of the total power spectra, the method 200 proceeds directly to operation 216, where the internet traffic classification system 114 calculates a mean and a variance of a remaining portion of the internet traffic sequence—that is, one or more samples remaining in the plurality of the consecutive samples after removal of one or more samples corresponding to the consumer traffic component 122. The method 200 then proceeds as described above.

Figure 3A:
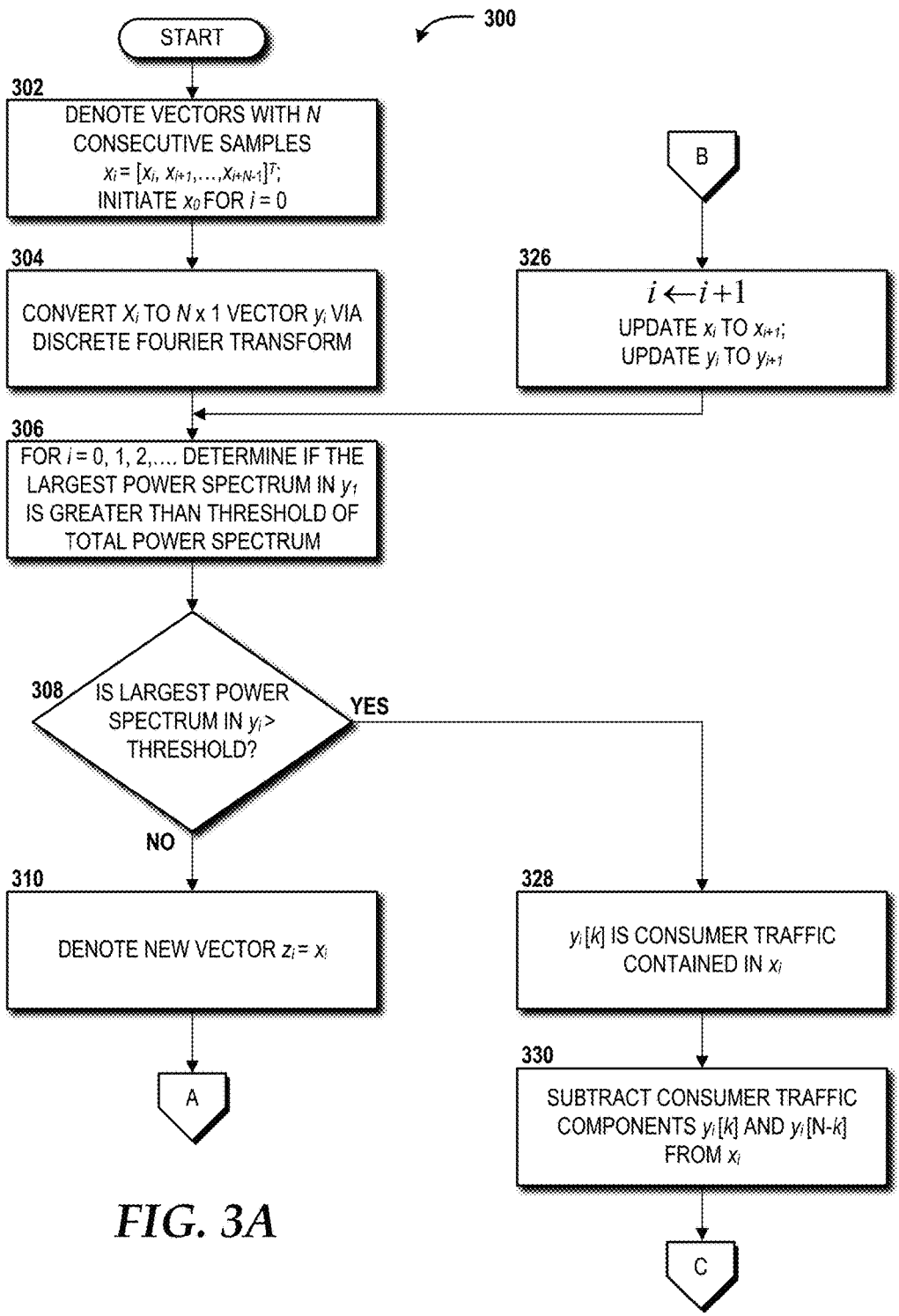
FIGS. 3A-3C are flow diagrams illustrating aspects of a more detailed method for classifying internet traffic, according to an illustrative embodiment.
Figure 3B:
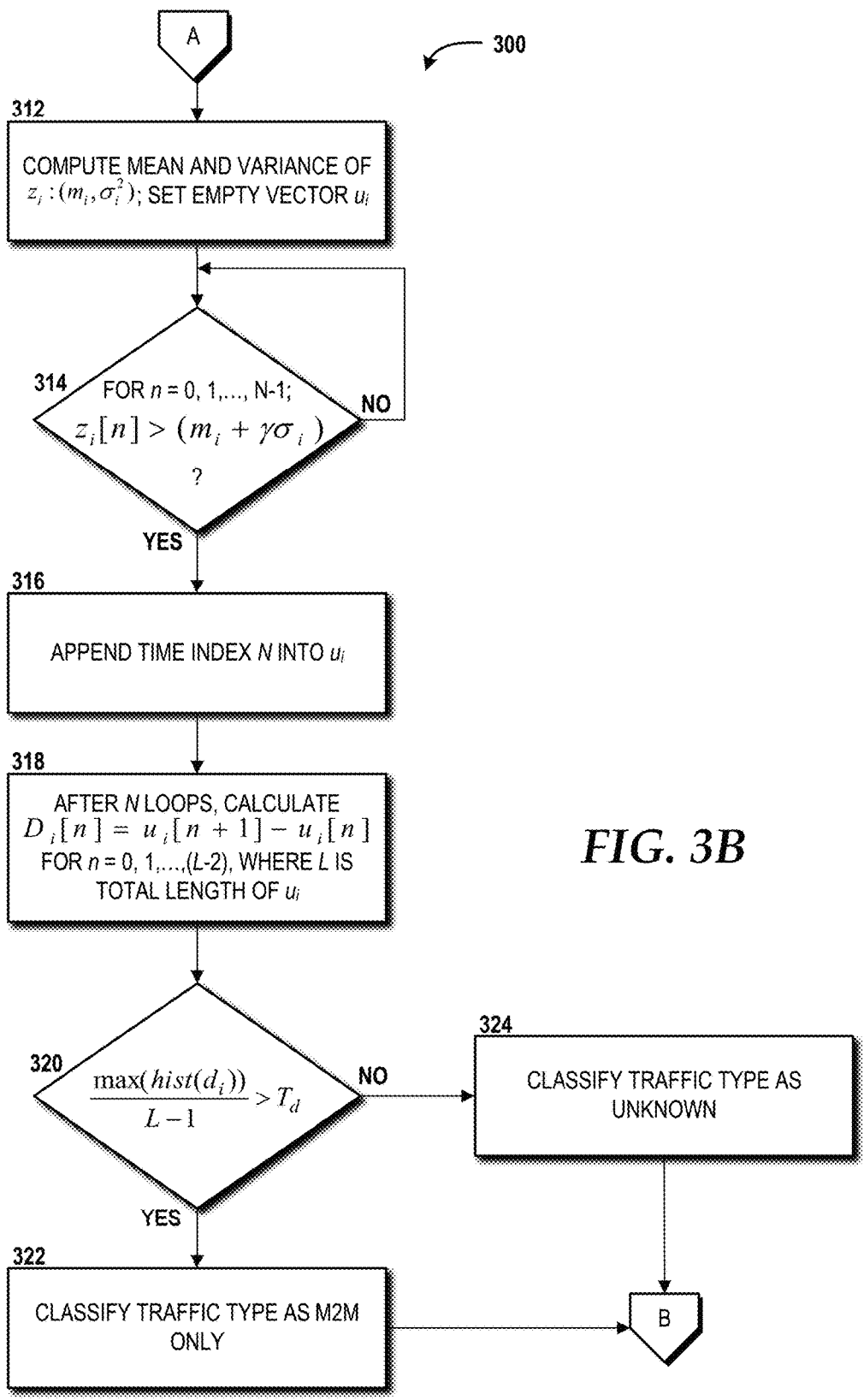
Figure 3C:
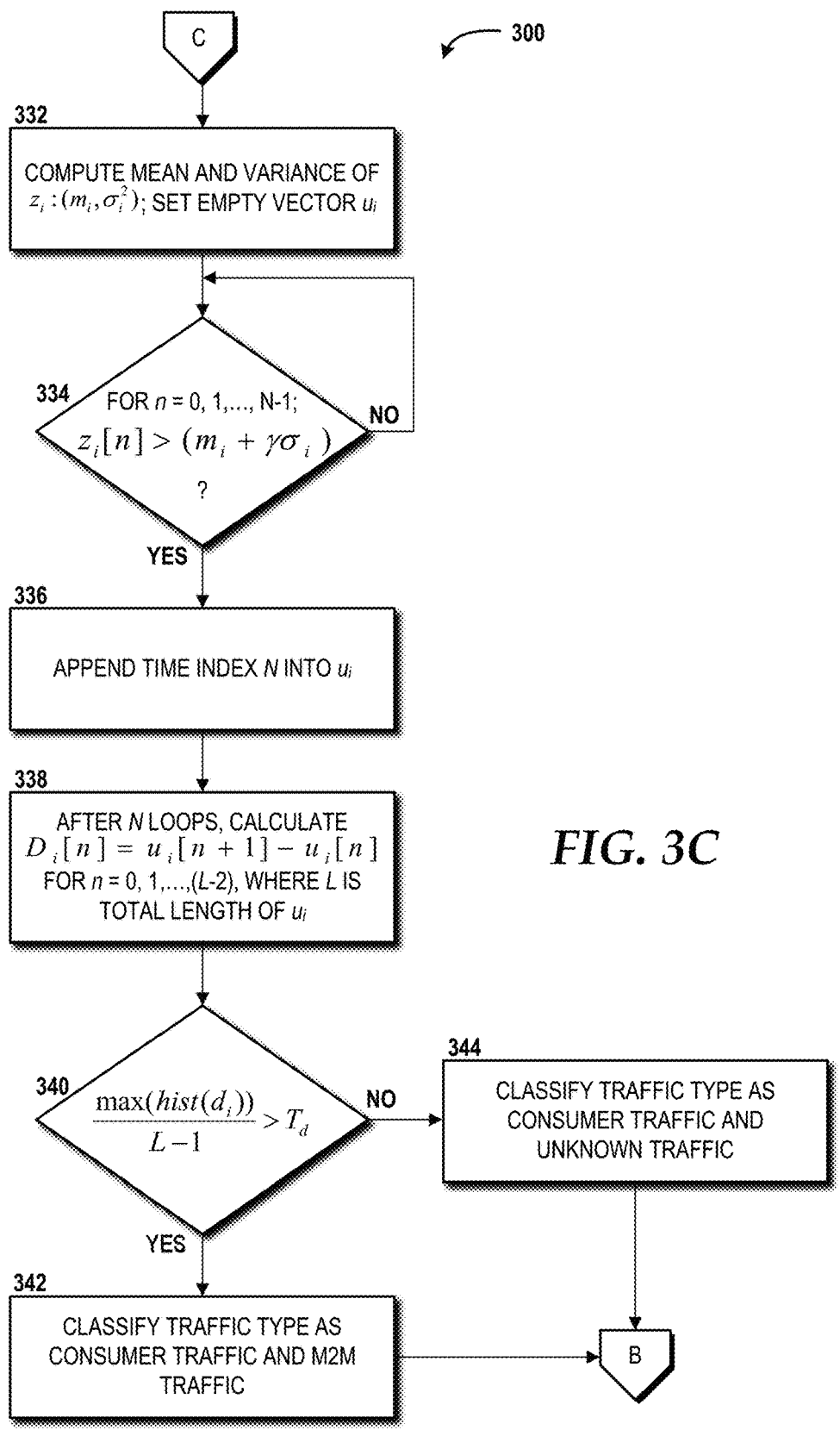

Turning now to FIGS. 3A-3C, a more detailed method 300 for classifying internet traffic will be described, according to an illustrative embodiment. The method 300 begins and proceeds to operation 302, where the internet traffic classification system 114 denotes a traffic time series $x_i$, $i=0, 1, \ldots$ and forms vectors from N consecutive samples in $x_i$ such that $x_i=[x_i, x_{i+1}, \ldots, x_{i+N-1}]^T$ and initiates $x_0$ for $i=0$.

From operation 302, the method 300 proceeds to operation 304, where the internet classification system 114 converts $x_i$ to a N×1 frequency vector $y_i$ via DFT such that $y_i=DFT(x_i)$. It should be noted that vectors $x_i$ and $x_{i+1}$ overlap (N−1) points. This overlapping property can be exploit to avoid the repeating calculations from $y_i$ to $y_{i+1}$, which is explained in the following recursive DFT. Denote $$\omega = e^{i\frac{2\pi}{N}}.$$

DFT of $x_i$ and $x_{i+1}$ be expressed as $$y_i = FFT(x_i) = \begin{bmatrix} 1 & 1 & 1 & \cdots & 1 \\ 1 & \omega & \omega^2 & \cdots & \omega^{(N-1)} \\ 1 & \omega^2 & \omega^4 & \cdots & \omega^{2(N-1)} \\ \vdots & \vdots & \vdots & \ddots & \vdots \\ 1 & \omega^{(N-1)} & \omega^{2(N-1)} & \cdots & \omega^{(N-1)^2} \end{bmatrix} \begin{bmatrix} x_i \\ x_{i+1} \\ \vdots \\ x_{i+N-2} \\ x_{i+N-1} \end{bmatrix}$$

$$y_{i+1} = FFT(x_{i+1}) = \begin{bmatrix} 1 & 1 & 1 & \cdots & 1 \\ 1 & \omega & \omega^2 & \cdots & \omega^{(N-1)} \\ 1 & \omega^2 & \omega^4 & \cdots & \omega^{2(N-1)} \\ \vdots & \vdots & \vdots & \ddots & \vdots \\ 1 & \omega^{(N-1)} & \omega^{2(N-1)} & \cdots & \omega^{(N-1)^2} \end{bmatrix} \begin{bmatrix} x_{i+1} \\ x_{i+2} \\ \vdots \\ x_{i+N-1} \\ x_{i+N} \end{bmatrix}$$

where the overlapped (N−1) elements are marked in bold.

From operation 302, the method 300 proceeds to operation 306, where, for i=0, 1, 2, . . . , the internet classification system 114 determines if the largest power spectrum in $y_i$ is greater than a threshold of the total power spectrum. After obtaining the vector $y_i$ via DFT, it is noted that DFT of a real signal is Hermetian symmetry—that is, $y_i[n]=\text{conj}(y_i[N-n])$ for all n. Due to this symmetry, to find the largest power spectrum within $y_i$, only half of the elements from $y_i[1]$ to $y_i[N/2]$ are needed (skip $y_i[0]$, which is a DC component).

$$\max\left(|y_i[1]|^2, |y_i[2]|^2, \ldots, \left|y_i\left[\frac{N}{2}\right]\right|^2\right) = |y_i[k]|^2 > \beta \sum_{n=1}^{\frac{N}{2}} |y_i[n]|^2$$

where $y_i[n]$ is the nth element in vector $y_i$, and $\beta$ is a configurable threshold of maximum power spectrum over the total power spectra.

From operation 306, the method 300 proceeds to operation 308, where if the internet classification system 114 determines that the largest power spectrum in $y_i$ is less than a threshold of the total power spectrum, the method 300 proceeds to operation 310, where the internet classification system 114 denotes a new vector $z_i=x_i$. Once the maximum power spectrum bin $y_i[k]$ is determined, then the symmetric frequency components $y_i[k]$ and $y_i[N-k]$ are calculated with consumer traffic to obtain a remaining vector $z_i$. The n-th element $z_i[n]$ is calculated as $$z_i[n] = x_i[n] - y_i[k]\frac{e^{jkn\frac{2\pi}{N}}}{N} - y_i[N-k]\frac{e^{-jkn\frac{2\pi}{N}}}{N} =$$
$$x_i[n] - \left(y_i[k]e^{jkn\frac{2\pi}{N}} + \text{conj}(y_i[k])e^{-jkn\frac{2\pi}{N}}\right) =$$
$$x_i[n] - \text{Real}\left(2 \times y_i[k]e^{-jkn\frac{2\pi}{N}}\right), \text{ where } n = 0, 1, \ldots, N-1.$$

From operation 310, the method proceeds to operation 312, shown in FIG. 3B, where the internet classification system 114 computes a mean and a variance of $z_i$ as $(m_i, \sigma_i^2)$ and sets an empty vector $u_i$. From operation 312, the method 300 proceeds to operation 314, where the internet classification system 114, for n=0, 1, . . . , N−1, tests each element in $z_i$ whether $z_i[n]>(m_i+\gamma\sigma_i)$, where $\gamma$ is a configurable threshold. If the result of a test is true, the method 300 proceeds to operation 316, where the internet classification system 114 appends the time index n as $u_i=[u_i; n]$. Else, the method 300 returns to operation 314 for the next value of n and repeats until N−1.

From operation 316, the method 300 proceeds to operation 318, where after the end of N loops with operations 314, 316, the internet classification system 114 calculates $D_i[n]=u_i[n+1]-u_i[n]$ for n=0, 1, . . . , (L−2), where L is the total length of $u_i$.

From operation 318, the method 300 proceeds to operation 320, where the internet classification system 114 calculates if $$\frac{\max(\text{hist}(d_i))}{L-1} > T_d,$$

where $\text{hist}(d_i)$ counts the number of occurrences with distinct values in $d_i$, and $T_d$ is a configurable threshold. If true, the method 300 proceeds from operation 320 to operation 322, where the internet classification system 114 classifies the traffic type as M2M only—that is only M2M traffic is contained in $z_i$. If false, the method 300 proceeds to operation 324, where the internet classification system 114 classifies traffic type as unknown. After operation 322 or 324, the method 300 proceeds to operation 326, shown in FIG. 3A, where the internet classification system 114 sets i←i+1 and updates $x_i$ to $x_{i+1}$, where $x_{i+1}=[x_{i+1}, x_{i+2}, \ldots, x_{i+N}]^T$; and lets $\delta_i=x_{i+N}-x_i$, updates $y_i$ to $y_{i+1}$ via recursive DFT such that $y_{i+1}[n]=w^{-n}(y_i[n]+\delta_i)$ for n=0, 1, . . . , N−1. From operation 326, the method 300 returns to the loop started at operation 306 and the method 300 continues as described.

Returning to operation 308, if the internet classification system 114 determines that the largest power spectrum in $y_i$ is greater than the threshold of the total power spectrum, the method 300 proceeds to operation 328, where the internet classification system 114 determines that $y_i[k]$ is consumer traffic contained in $x_i$. From operation 328, the method 300 proceeds to operation 330, where the internet classification system 114 subtracts the consumer traffic components $y_i[k]$ and $y_i[N-k]$ from $x_i$. From operation 330, the method 300 proceeds to operation 332, shown in FIG. 3C, where the internet classification system 114 computes a mean and a variance of $z_i$: $(m_i, \sigma_i^2)$ and sets an empty vector $u_i$. From operation 332, the method 300 proceeds to operation 334, where the internet classification system 114, for n=0, 1, . . . , N−1, tests each element in $z_i$ whether $z_i[n]>(m_i+\gamma\sigma_i)$, where $\gamma$ is a configurable threshold. If the result of a test is true, the method 300 proceeds to operation 336, where the internet classification system 114 appends the time index n as $u_i=[u_i; n]$. Else, the method 300 returns to operation 334 for the next value of n and repeats until N−1.

From operation 336, the method 300 proceeds to operation 338, where after the end of N loops with operations 334, 336, the internet classification system 114 calculates $D_i[n]=u_i[n+1]-u_i[n]$ for n=0, 1, . . . , (L−2), where L is the total length of $u_i$.

From operation 338, the method 300 proceeds to operation 340, where the internet classification system 114 calculates if $$\frac{\max(\text{hist}(d_i))}{L-1} > T_d,$$

where hist($d_i$) counts the number of occurrences with distinct values in $d_i$, and $T_d$ is a configurable threshold. If true, the method 300 proceeds from operation 340 to operation 342, where the internet classification system 114 classifies the traffic type as consumer traffic and M2M traffic. If false, the method 300 proceeds to operation 344, where the internet classification system 114 classifies traffic type as consumer traffic and unknown traffic. After operation 342 or 344, the method 300 proceeds to operation 326, shown in FIG. 3A, where the internet classification system 114 sets $i \leftarrow i+1$ and updates $x_i$ to $x_{i+1}$, where $x_{i+1} = [x_{i+1}, x_{i+2}, \ldots, x_{i+N}]^T$; and lets $\delta_i = x_{i+N} - x_i$, updates $y_i$ to $y_{i+1}$ via recursive DFT such that $y_{i+1}[n] = w^{-n}(y_i[n] + \delta_i)$ for $n = 0, 1, \ldots, N-1$. From operation 326, the method 300 returns to the loop started at operation 306 and the method 300 continues as described.

Figure 4:
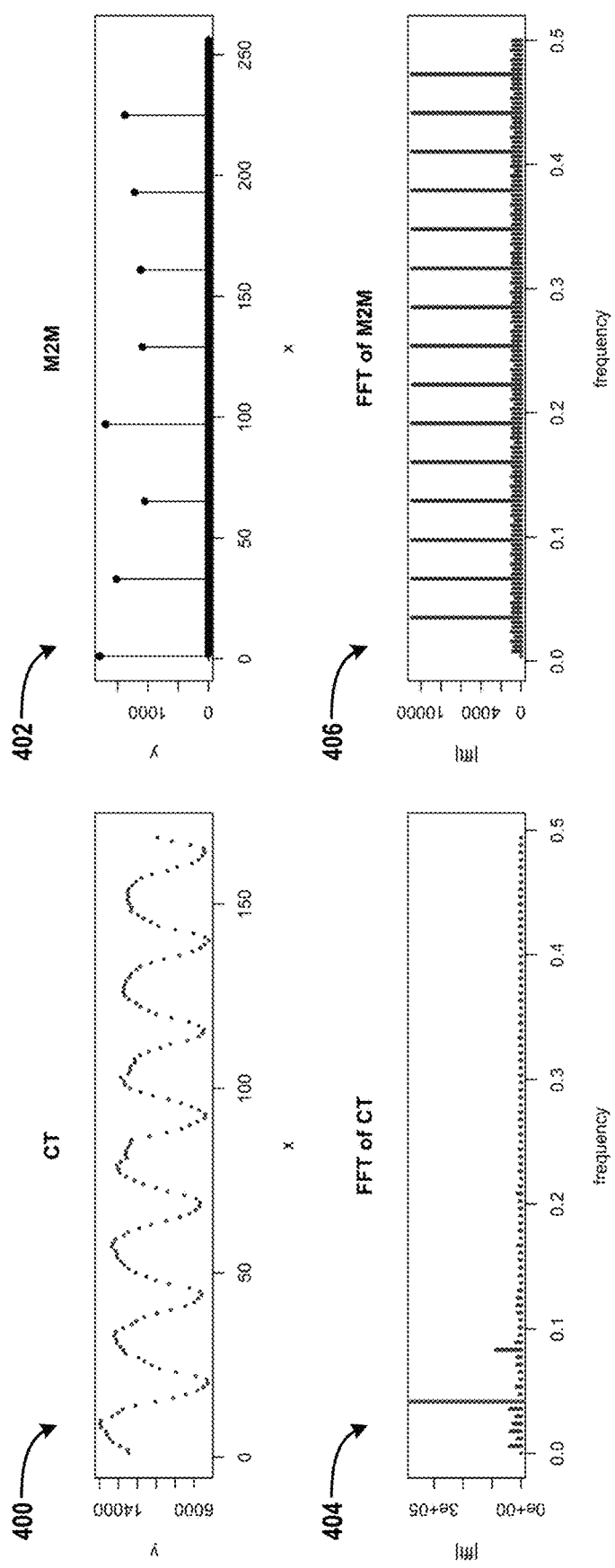
FIG. 4 is a diagram illustrating aspects of consumer traffic and M2M traffic before and after applying a discrete Fourier transform ("DFT"), according to an illustrative example.

Turning now to FIG. 4, a diagram illustrating aspects of consumer traffic and M2M traffic before and after applying a DFT in accordance with the methodologies described herein above will be described, according to an illustrative example. An example of typical consumer traffic (400) is shown as being close to a periodic sinusoid with a single dominant high spike in frequency spectra, while typical M2M traffic (402) has evenly distributed spectrum with multiple identical spikes. When both consumer traffic and M2M traffic are contained in the network traffic, due to the high spike with consumer traffic, it is easier to identify and subtract consumer traffic from M2M traffic (see operation 330 in FIG. 3A) in the frequency domain rather than in the time domain—as shown in 404, 406.

Figure 5:
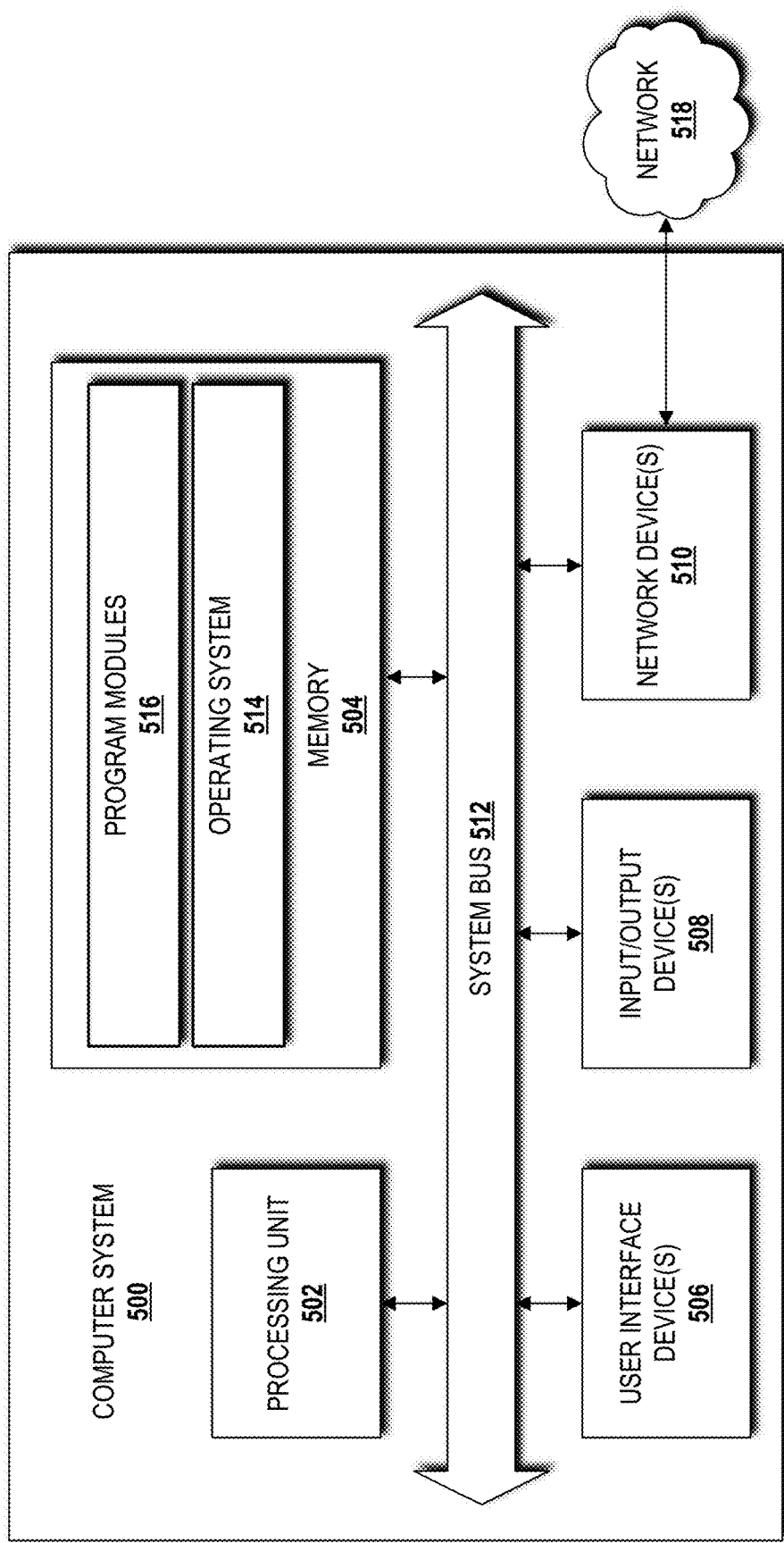
FIG. 5 is a block diagram illustrating an example computer system and components thereof capable of implementing aspects of the embodiments presented herein.

Turning now to FIG. 5 is a block diagram illustrating a computer system 500 configured to provide the functionality in accordance with various embodiments of the concepts and technologies disclosed herein. The systems, devices, and other components disclosed herein can utilize, at least in part, an architecture that is the same as or at least similar to the architecture of the computer system 500. For example, the UE(s) 102, M2M device(s) 108, and/or the Internet traffic classification system 114 can utilize, at least in part, an architecture that is the same as or at least similar to the architecture of the computer system 500. It should be understood, however, that modification to the architecture may be made to facilitate certain interactions among elements described herein.

The computer system 500 includes a processing unit 502, a memory 504, one or more user interface devices 506, one or more I/O devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistant ("PDAs"), cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN"). The network 518 can be or can include the network 110 (see FIG. 1), or any other network or combination of networks described herein.

Figure 6:
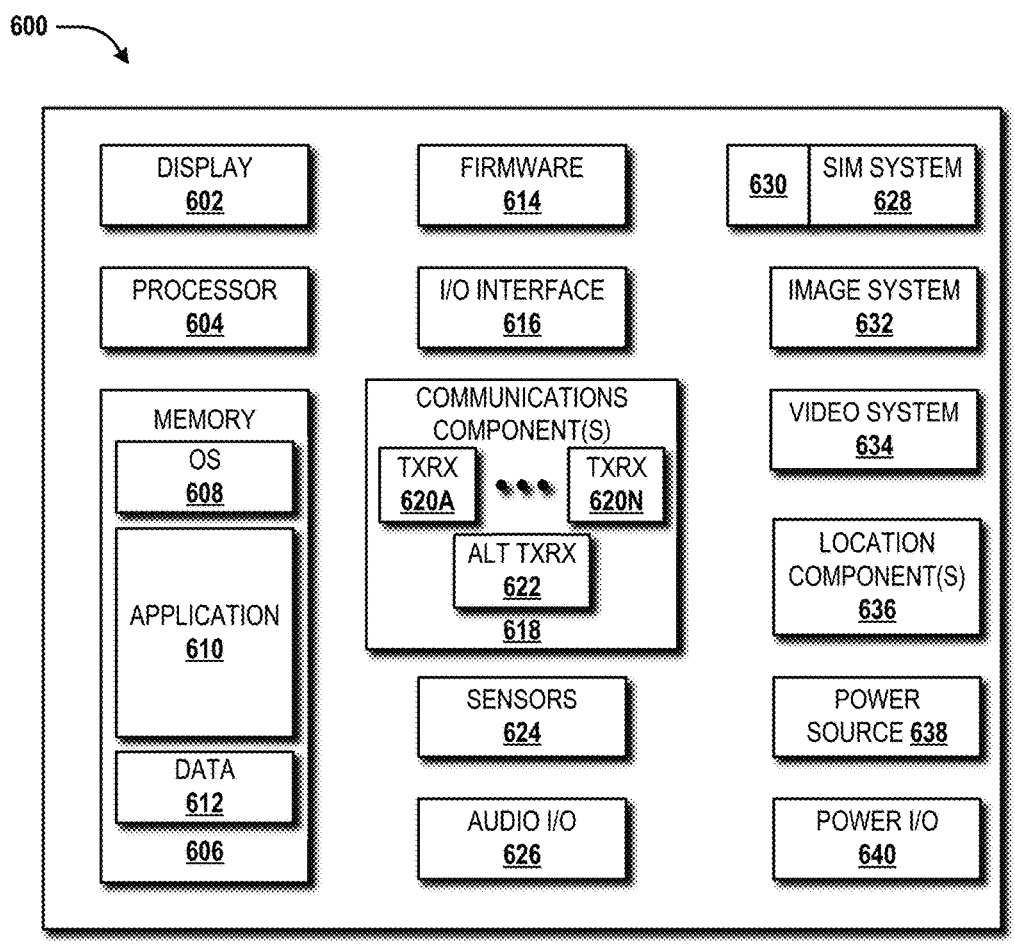
FIG. 6 is a block diagram illustrating an example mobile device and components thereof capable of implementing aspects of the embodiments presented herein.

Turning now to FIG. 6, an illustrative mobile device 600 and components thereof will be described. In some embodiments, the UE(s) 102 and/or the M2M device(s) 108 can be configured like the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UI") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as database data, location information, user information, organization information, presence status information, user IDs, passwords, and application initiation (start-up) requests. In some embodiments, the I/O interface 616 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RHO port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA ONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 618 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
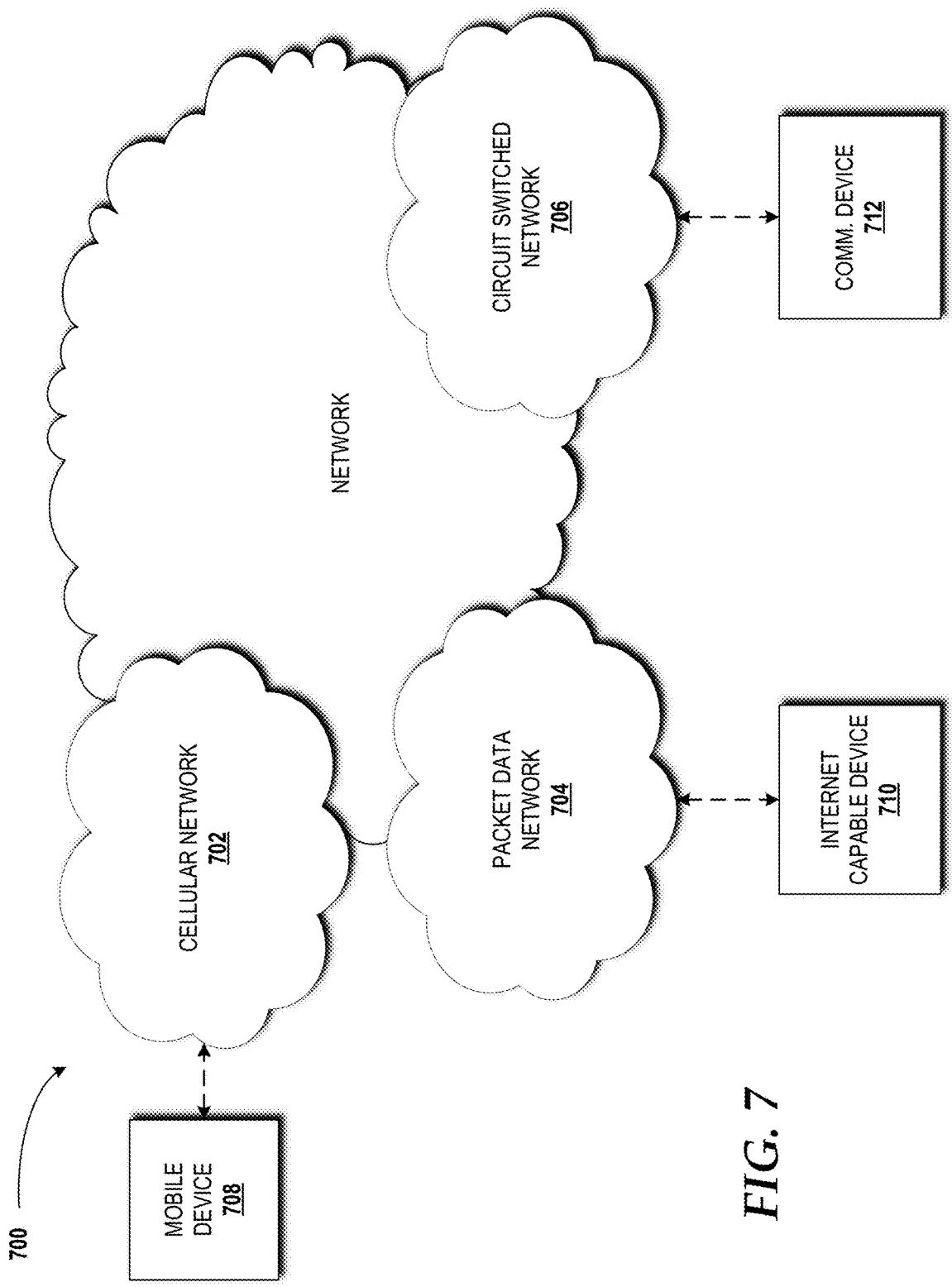
FIG. 7 is a block diagram illustrating an example network capable of implementing aspects of the embodiments presented herein.

Turning now to FIG. 7, details of a network 700 are illustrated, according to an illustrative embodiment. The network 700 includes a cellular network 702, a packet data network 704, and a circuit switched network 706, for example, a publicly switched telephone network ("PSTN"). In some embodiments, the network 110 introduced above in FIG. 1 can be configure the same as or like the network 700.

The cellular network 702 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the UE 102, the M2M device 108, a computing device, a cellular telephone, a mobile terminal, a PDA, a laptop computer, a handheld computer, and combinations thereof, can be operatively connected to the cellular network 702. The cellular network 702 can be configured as a 2G GSM network and can provide data communications via GMPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 700 is used to refer broadly to any combination of the networks 702, 704, 706. It should be appreciated that substantially all of the functionality described with reference to the network 700 can be performed by the cellular network 702, the packet data network 704, and/or the circuit switched network 706, alone or in combination with other networks, network elements, and the like.

Figure 8:
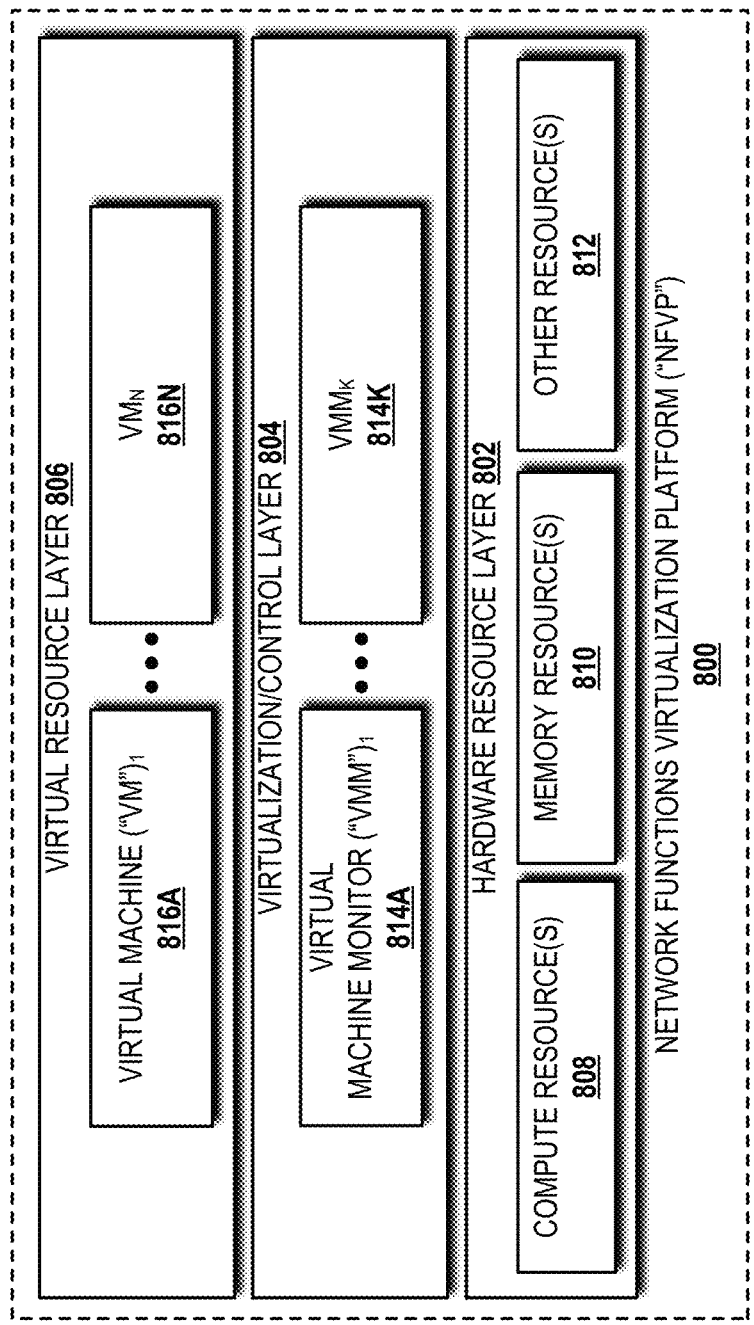
FIG. 8 is a block diagram illustrating an example network function virtualization platform capable of implementing aspects of the embodiments presented herein.

Turning now to FIG. 8, a network functions virtualization platform ("NFVP") 800 will be described, according to an exemplary embodiment. The architecture of the NFVP 800 can be used to implement, at least in part, the internet traffic classification system 114 in some embodiments. The NFVP 800 is a shared infrastructure that can support multiple services and network applications. The illustrated NFVP 800 includes a hardware resource layer 802, a virtualization/control layer 804, and a virtual resource layer 806 that work together to perform operations as will be described in detail herein.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, Calif., and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 814A-814K (also known as "hypervisors"; hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816"). Each of the VMs 816 can execute one or more applications.

Based on the foregoing, it should be appreciated that concepts and technologies directed to internet traffic classification via time-frequency analysis have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. An Internet traffic classification system comprising:
a processor; and
a memory comprising instructions that, when executed by the processor, cause the processor to perform operations comprising
receiving an internet traffic sequence comprising non-malicious data packets and malicious data packets,
extracting, from the internet traffic sequence, a plurality of consecutive samples to be used for classification of the internet traffic sequence,
converting the plurality of consecutive samples of the internet traffic sequence from a time domain to a frequency domain via a recursive discrete Fourier transform,
determining whether a largest power spectrum in the plurality of consecutive samples of the internet traffic sequence is greater than a threshold portion of a total power spectra of the plurality of consecutive samples of the internet traffic sequence,
when the largest power spectrum in the plurality of consecutive samples of the internet traffic sequence is greater than the threshold portion of the total power spectra,
determining that the plurality of consecutive samples of the internet traffic sequence comprises a consumer traffic component, and
removing, from the plurality of consecutive samples of the internet traffic sequence, any samples of the plurality of consecutive samples corresponding to the consumer traffic component,
calculating a mean and a variance of a remaining portion of the internet traffic sequence, wherein the remaining portion of the internet traffic sequence comprising the plurality of consecutive samples without any samples corresponding to the consumer traffic component, setting, based upon the mean and the variance of the remaining portion of the internet traffic sequence, a threshold for detection of machine-to-machine traffic, recording a series of time indices for samples in the remaining portion of the internet traffic sequence that are greater than the threshold for detection of machine-to-machine traffic, computing time differences between adjacent time indices within the series of time indices, creating a histogram using the time differences, counting the histogram, and when most occurrences in the histogram are in association with a specific time difference, determining that the remaining portion of the internet traffic sequence comprises a machine-to-machine-traffic component.

2. The internet traffic classification system of claim 1, wherein the operations further comprise classifying the internet traffic sequence as comprising the consumer traffic component only.

3. The internet traffic classification system of claim 1, wherein the operations further comprise classifying the internet traffic sequence as comprising the machine-to-machine traffic component only.

4. The internet traffic classification system of claim 1, wherein the operations further comprise classifying the internet traffic sequence as comprising the consumer traffic component and the machine-to-machine traffic component.

5. The internet traffic classification system of claim 1, wherein the operations further comprise classifying the internet traffic sequence as comprising an unknown traffic component.

6. The internet traffic classification system of claim 1, wherein the operations are performed through a sliding window that focuses on one sample of the plurality of consecutive samples.

7. The Internet traffic classification system of claim 1, wherein the Internet traffic sequence comprises real-time Internet traffic.

8. A computer-readable storage medium comprising computer-executable instructions that, when executed by a processor, cause the processor to perform operations comprising:

receiving an Internet traffic sequence comprising non-malicious data packets and malicious data packets, extracting, from the Internet traffic sequence, a plurality of consecutive samples to be used for classification of the Internet traffic sequence, converting the plurality of consecutive samples of the Internet traffic sequence from a time domain to a frequency domain via a recursive discrete Fourier transform, determining whether a largest power spectrum in the plurality of consecutive samples of the internet traffic sequence is greater than a threshold portion of a total power spectra of the plurality of consecutive samples of the Internet traffic sequence, when the largest power spectrum in the plurality of consecutive samples of the Internet traffic sequence is greater than the threshold portion of the total power spectra, determining that the plurality of consecutive samples of the Internet traffic sequence comprises a consumer traffic component, and removing, from the plurality of consecutive samples of the Internet traffic sequence, any samples of the plurality of consecutive samples corresponding to the consumer traffic component, calculating a mean and a variance of a remaining portion of the Internet traffic sequence, wherein the remaining portion of the Internet traffic sequence comprising the plurality of consecutive samples without any samples corresponding to the consumer traffic component, setting, based upon the mean and the variance of the remaining portion of the Internet traffic sequence, a threshold for detection of machine-to-machine traffic, recording a series of time indices for samples in the remaining portion of the Internet traffic sequence that are greater than the threshold for detection of machine-to-machine traffic, computing time differences between adjacent time indices within the series of time indices, creating a histogram using the time differences, counting the histogram, and when most occurrences in the histogram are in association with a specific time difference, determining that the remaining portion of the internet traffic sequence comprises a machine-to-machine-traffic component.

9. The computer-readable storage medium of claim 8, wherein the operations further comprise classifying the internet traffic sequence as comprising the consumer traffic component only.

10. The computer-readable storage medium of claim 8, wherein the operations further comprise classifying the internet traffic sequence as comprising the machine-to-machine traffic component only.

11. The computer-readable storage medium of claim 8, wherein the operations further comprise classifying the internet traffic sequence as comprising the consumer traffic component and the machine-to-machine traffic component.

12. The computer-readable storage medium of claim 8, wherein the operations further comprise classifying the internet traffic sequence as comprising an unknown traffic component.

13. The computer-readable storage medium of claim 8, wherein the operations are performed through a sliding window that focuses on one sample of the plurality of consecutive samples.

14. A method comprising:

receiving, by an internet traffic classification system comprising a processor, an internet traffic sequence comprising non-malicious data packets and malicious data packets;

extracting, by the internet traffic classification system, from the internet traffic sequence, a plurality of consecutive samples to be used for classification of the internet traffic sequence;

converting, by the internet traffic classification system, the plurality of consecutive samples of the internet traffic sequence from a time domain to a frequency domain via a recursive discrete Fourier transform;

determining, by the internet traffic classification system, whether a largest power spectrum in the plurality of consecutive samples of the internet traffic sequence is greater than a threshold portion of a total power spectra of the plurality of consecutive samples of the internet traffic sequence;

when the largest power spectrum in the plurality of consecutive samples of the internet traffic sequence is greater than the threshold portion of the total power spectra,
- determining, by the internet traffic classification system, that the plurality of consecutive samples of the internet traffic sequence comprises a consumer traffic component, and
- removing, by the internet traffic classification system, from the plurality of consecutive samples of the internet traffic sequence, any samples of the plurality of consecutive samples corresponding to the consumer traffic component;

calculating, by the internet traffic classification system, a mean and a variance of a remaining portion of the internet traffic sequence, wherein the remaining portion of the internet traffic sequence comprising the plurality of consecutive samples without any samples corresponding to the consumer traffic component;

setting, by the internet traffic classification system, based upon the mean and the variance of the remaining portion of the internet traffic sequence, a threshold for detection of machine-to-machine traffic;

recording, by the internet traffic classification system, a series of time indices for samples in the remaining portion of the internet traffic sequence that are greater than the threshold for detection of machine-to-machine traffic;

computing, by the internet traffic classification system, time differences between adjacent time indices within the series of time indices;

creating, by the internet traffic classification system, a histogram using the time differences;

counting, by the internet traffic classification system, the histogram; and when most occurrences in the histogram are in association with a specific time difference, determining, by the internet traffic classification system, that the remaining portion of the internet traffic sequence comprises a machine-to-machine-traffic component.

15. The method of claim 14, further comprising classifying the internet traffic sequence as comprising the consumer traffic component only.

16. The method of claim 14, further comprising classifying the internet traffic sequence as comprising the machine-to-machine component only.

17. The method of claim 14, further comprising classifying the internet traffic sequence as comprising the consumer traffic component and the machine-to-machine traffic component.

18. The method of claim 14, further comprising classifying the internet traffic sequence as comprising an unknown traffic component.

* * * * *